United States Patent
Chowdhury et al.

(10) Patent No.: US 10,275,454 B2
(45) Date of Patent: Apr. 30, 2019

(54) IDENTIFYING SALIENT TERMS FOR PASSAGE JUSTIFICATION IN A QUESTION ANSWERING SYSTEM

(71) Applicant: International Business Machines Corporation, Armonk, NY (US)

(72) Inventors: Md Faisal Mahbub Chowdhury, White Plains, NY (US); Alfio M. Gliozzo, New York, NY (US); Adam Lally, Cold Spring, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 514 days.

(21) Appl. No.: 14/512,539

(22) Filed: Oct. 13, 2014

(65) Prior Publication Data
US 2016/0104075 A1    Apr. 14, 2016

(51) Int. Cl.
*G06F 17/27*    (2006.01)

(52) U.S. Cl.
CPC ........ *G06F 17/2785* (2013.01); *G06F 17/271* (2013.01)

(58) Field of Classification Search
None
See application file for complete search history.

(56) References Cited

U.S. PATENT DOCUMENTS

| | | | |
|---|---|---|---|
| 8,488,916 B2 | 7/2013 | Terman | |
| 2004/0205448 A1* | 10/2004 | Grefenstette | ..... G06F 17/30867 715/230 |
| 2006/0116861 A1 | 6/2006 | Kaplan et al. | |
| 2009/0070311 A1* | 3/2009 | Feng | ................. G06F 17/30654 |
| 2009/0287678 A1* | 11/2009 | Brown | .............. G06F 17/30654 |
| 2012/0330934 A1 | 12/2012 | Duboue et al. | |

* cited by examiner

Primary Examiner — Kakali Chaki
Assistant Examiner — Michael Zidanic
(74) Attorney, Agent, or Firm — Cantor Colburn LLP; Will Stock (57) ABSTRACT

According to an aspect, a term saliency model is trained to identify salient terms that provide supporting evidence of a candidate answer in a question answering computer system based on a training dataset. The question answering computer system can perform term saliency weighting of a candidate passage to identify one or more salient terms and term weights in the candidate passage based on the term saliency model. The one or more salient terms and term weights can be provided to at least one passage scorer of the question answering computer system to determine whether the candidate passage is justified as providing supporting evidence of the candidate answer.

15 Claims, 6 Drawing Sheets

IDENTIFYING SALIENT TERMS FOR PASSAGE JUSTIFICATION IN A QUESTION ANSWERING SYSTEM

BACKGROUND

The present disclosure relates generally to a question answering computer system, and more specifically, to identifying salient terms for passage justification in a question answering computer system.

An information retrieval computer system typically receives a query, identifies keywords in the query, searches documents for the keywords, and ranks results of the searching to identify best matches. Some information retrieval computer systems output a list of best matching results to a user, such that the user can then attempt to determine if desired information can be found in the results. Keyword searching often uses frequency-based scoring for words or synonyms, but such searches typically fail to consider the context of particular words. More advanced question answering computer systems typically employ natural-language processing (NPL) that returns a highest scoring answer to a question in a natural language format. NLP techniques, which are also referred to as text analytics, infer the meaning of terms and phrases by analyzing their syntax, context, and usage patterns.

Human language is so complex, variable (there are many different ways to express the same meaning), and polysemous (the same word or phrase may mean many things in different contexts) that NPL presents an enormous technical challenge. Decades of research have led to many specialized techniques each operating on language at different levels and on different isolated aspects of the language understanding task. These techniques include, for example, shallow parsing, deep parsing, information extraction, word-sense disambiguation, latent semantic analysis, textual entailment, and co-reference resolution. None of these techniques is perfect or complete in their ability to decipher the intended meaning. Unlike programming languages, human languages are not formal mathematical constructs. Given the highly contextual and implicit nature of language, humans themselves often disagree about the intended meaning of any given expression.

Detecting semantic relations in text is very useful in both information retrieval and question answering because it enables knowledge bases (KBs) to be leveraged to score passages and retrieve candidate answers. Approaches for extracting semantic relations from text include exploitation of statistics about co-occurrences of terms, usage of patterns and rules, usage of different features (such as lexical, syntactic, semantic and contextual) to train machine learning (ML) classifiers, various kernel based ML approaches and hybrid approaches that combine multiple ML based approaches.

A question answering computer system can use a primary search to retrieve documents, passages and other types of information (from both structured, e.g., a knowledgebase, and unstructured sources), with respect to a query formulated from a given question, which are later used for candidate answer generation. Candidate answers can then be evaluated with respect to candidate passage evidence that supports or refutes the candidate answer. The objective of supporting evidence retrieval is to retrieve candidate passages with respect to a query formulated from the question plus the candidate answer. Just a minor fraction of the collected passages exhibit evidence that is actually useful to justify the answer, therefore a critical capability of a question answering computer system is to decide whether it is worthwhile to consider a passage for generating evidence. The task of identifying which of the retrieved passages are actually providing useful information to answer the question is also known as passage justification. Passage scorers use various techniques to judge a candidate passage, including methods based on surface similarity (i.e. textual alignment) with the question, logical form alignment, structural similarity based on syntactic-semantic graphs, various linguistic features, etc.

SUMMARY

Embodiments include a method, system, and computer program product for identifying salient terms for passage justification in a question answering computer system. In one aspect, a term saliency model is trained to identify salient terms that provide supporting evidence of a candidate answer in a question answering computer system based on a training dataset. The question answering computer system can perform term saliency weighting of a candidate passage to identify one or more salient terms and term weights in the candidate passage based on the term saliency model. The one or more salient terms and term weights can be provided to at least one passage scorer of the question answering computer system to determine whether the candidate passage is justified as providing supporting evidence of the candidate answer.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments disclosed herein relate to identifying salient terms for passage justification. A question answering computer system can decide which terms contained in a passage actually provide supporting evidence for a candidate answer to a question. These terms are referred to herein as "salient terms". The question answering computer system can also determine which terms in a passage are just there but do not add information for the purposes of passage justification. The task of discovering salient terms and distinguishing them from the other terms is called "salient term identification". A candidate passage can include a sentence containing a candidate answer and a window of sentences before and after it. Many of the terms in these sentences are not relevant for the purposes of finding evidence justifying the answer. Salient terms are a group of terms in a candidate passage that together connect the dots to provide evidence for a candidate answer being the answer for the given question, if the passage justifies it.

Unlike keyphrases, salient terms do not depend on a term frequency—inverse document frequency (TF/IDF) score or other frequency based measures. Salient terms do not necessarily have to be mentioned (either explicitly or implicitly as synonyms) inside a natural language question. If a term is a keyphrase with respect to a question/query, all instances of that term inside a candidate passage or document are keyphrases too. In contrast, all instances of the same term are not necessarily salient. If a term is a keyphrase for a question, it is a keyphrase for any candidate passage (or document) for that question. However, even for the same question, if a term is salient in one candidate passage, there is no guarantee that it might be also salient in another passage since it would depend on how and where inside the candidate passage the term is used.

Figure 1:
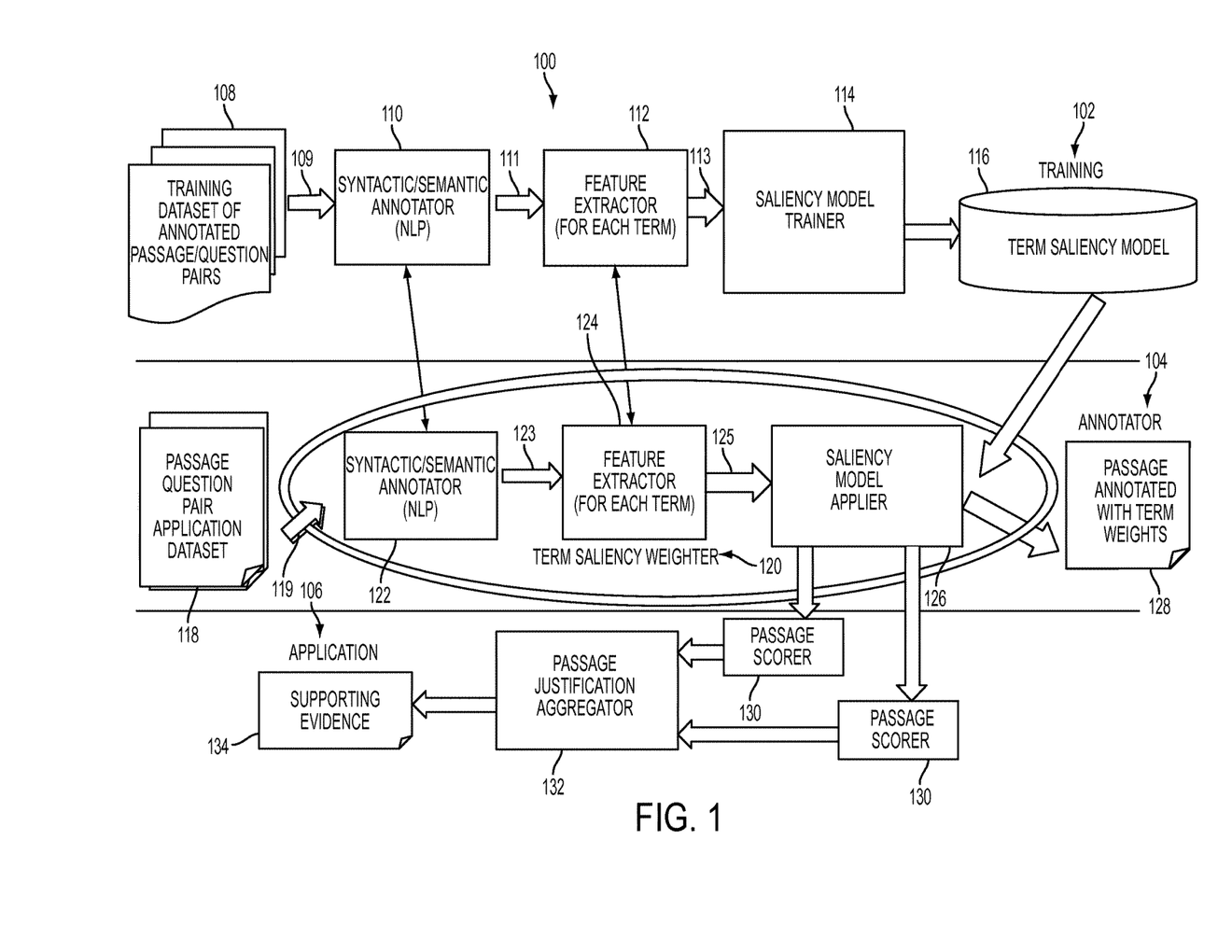
FIG. 1 depicts a block diagram of a dataflow for identifying salient terms for passage justification in accordance with an embodiment.

FIG. 1 depicts a block diagram of a dataflow 100 for identifying salient terms for passage justification in accordance with an embodiment. The dataflow 100 includes a training phase 102, an annotator phase 104, and an application phase 106. In the training phase 102, annotated passage and question pairs 109 of training dataset 108 are provided to a syntactic and semantic annotator 110 using natural language processing. The syntactic and semantic annotator 110 can produce an annotated set of terms 111 based on at least a subset of annotated candidate passages from the annotated passage and question pairs 109. Feature extraction is performed by a feature extractor 112 for each of the annotated set of terms 111 after syntactic and semantic annotation to determine feature scores 113. The feature scores 113 from the feature extractor 112 and identified salient terms from the annotated passage and question pairs 109 are used by a known machine learning algorithm (e.g., logistic regression, support vector machines, etc.) for training referred to as a saliency model trainer 114 to form a term saliency model 116.

The annotator phase 104 acts upon an application dataset 118 that can include one or more candidate passage and question pairs 119, which are provided to a term saliency weighter 120. The term saliency weighter 120 can include a syntactic and semantic annotator 122, a feature extractor 124, and a saliency model applier 126. The syntactic and semantic annotator 122 and feature extractor 124 can perform similar operations as the syntactic and semantic annotator 110 and feature extractor 112 of the training phase 102 to produce an annotated set of terms 123 and feature scores 125. In contrast to the training dataset 108, the application dataset 118 does not include annotation of salient terms. The terms from the feature extractor 124 can be used by the saliency model applier 126 along with the term saliency model 116 to form a passage annotated with term weights 128 based on the feature scores 125. Salient terms identified by the saliency model applier 126 may represent potential or likely salient terms with term weights indicating an estimated degree of salience, i.e., relevancy to answering a corresponding question from the candidate passage and question pairs 119. Output of the saliency model applier 126 can also be provided to one or more passage scorers 130. Results of the one or more passage scorers 130 can be provided to a passage justification aggregator 132 in the application phase 106. The passage justification aggregator 132 may be used to confirm supporting evidence 134.

The annotated passage and question pairs 109 in the training dataset 108 can include a body of documents, journals, manuals, studies, and the like which have been annotated by experts to identify examples of salient terms. The experts can be given annotation guidance and presented with example questions and passages, with the results recorded in the annotated passage and question pairs 109 of the training dataset 108. In one embodiment, experts are presented with a salient term annotation user interface (not depicted) that instructs the experts to select words in each passage that are relevant to answering a given question or to indicate that the passage does not justify a candidate answer to the question, where the candidate answer to the question is also provided. Each salient term can include one or more words that are likely important to justify a candidate answer. Once the annotated passage and question pairs 109 are populated with a sufficient number of samples in the training dataset 108, outputs of the syntactic and semantic annotator 110 and feature extractor 112 can be used by the saliency model trainer 114 to form the term saliency model 116.

The syntactic and semantic annotator 110 can parse the text of the annotated passage and question pairs 109 and further annotate terms as being syntactic or semantic. For example, sentences can be decomposed to identify a subject or verb, and one or more term synonyms may be identified. A known parser, such as an English Slot Grammar (ESG) parser, can be used for syntactic analysis, and a known resource or tool, such as WordNet, can be used for synonymy annotation. The feature extractor 112 can extract each term and apply a number of feature identifiers to select various feature types and identify potential salient terms. Table 1 depicts an example of features that can be analyzed by the feature extractor 112.

TABLE 1

Example features for salient term identification

| Feature Name | Description |
|---|---|
| Feat-1 | Part-of-speech of the target term (i.e. the term which is the subject of saliency prediction) |
| Feat-2 | Whether the target term is inside the same sentence as the candidate answer |
| Feat-3 | Whether the target term is a verb and it syntactically governs the candidate answer |
| Feat-4 | Whether the target term is a verb and it governs another term (inside the passage) which is similar to a term that is part of the focus of the question |
| Feat-5 | Whether the target term is a synonym of a term in question according to WordNet (regardless of their senses) |
| Feat-6 | Is the head word of the target term seen inside the question |
| Feat-7 | Is any of the word (excluding stop word) of the target term seen inside the question |
| Feat-8 | If the target term is not inside the same sentence where the candidate answer is, but this sentence contains a term which is synonym of the target term |
| Feat-9 | Token distance w.r.t. the candidate answer, if the target term is inside same sentence as the candidate answer |
| Feat-10 | The total number of terms that syntactically depend on the target term |

TABLE 1-continued

Example features for salient term identification

| Feature Name | Description |
| --- | --- |
| Feat-11 | Part-of-speech of the immediate previous term if that term is predicated salient by the system |
| Feat-12 | Part-of-speech of the immediate following term if that term is predicated salient by the system |
| Feat-13 | The sentence that contains the target term is the most informative sentence (i.e. contains the most number of question terms) of the passage and if the term is a modifier of the candidate answer |

Each of the features in Table 1 can cover one or more feature type and are domain independent. For example, Feat-1 and Feat-10 are syntactic; Feat-2 and Feat-9 are contextual; Feat-3 and Feat-4 are syntactic and contextual; Feat-5 and Feat-8 are semantic and contextual; Feat-6, Feat-7, Feat-11 and Feat-12 are contextual and syntactic; Feat-13 is contextual, syntactic, and semantic. A combination of the features can be used by the saliency model trainer 114 to form the term saliency model 116. Training can be performed in stages, where a number of features, such as Feat-1—Feat-11 and Feat-13, may be used as a first set of features in a first training stage that considers all terms of a selected passage from the annotated passage and question pairs 109. A second training stage can operate on terms neighboring potentially salient terms identified in the first training stage using a second set of the features, which can result in the term saliency model 116, where the first set of the features may partially overlap the second set of the features. Terms that are deemed salient terms represent positive example data, and terms that are not deemed salient terms represent negative example data. Parameter tuning performed by the saliency model trainer 114 to develop the term saliency model 116 need not analyze all of the annotated passage and question pairs 109 of the training dataset 108 but can randomly select a subset of the data for training, e.g., about 10%.

The syntactic and semantic annotator 122 of the term saliency weighter 120 can access a candidate passage from the application dataset 118 and perform syntactic and semantic annotation to produce the annotated set of terms 123, similar to the syntactic and semantic annotator 110. The feature extractor 124 may also perform feature extraction and feature-based scoring using the same feature definitions, e.g., as defined in Table 1, as the feature extractor 112. For example, feature extraction can be performed on the annotated set of terms 123 based on a plurality of features and a corresponding question from the candidate passage and question pairs 119 to determine a plurality of feature scores 125. The saliency model applier 126 can apply the term saliency model 116 to the feature scores 125 to identify one or more salient terms and term weights from the candidate passage of the candidate passage and question pairs 119.

Although FIG. 1 depicts a pair of passage scorers 130, any number of passage scorers 130 can be used to provide scoring for the passage justification aggregator 132. In one embodiment, there are twenty-one different types of passage scorers 130. One of the passage scorers 130 may be a bigram scorer. A bigram scorer assigns a score by matching pairs of terms that are connected or nearly connected (skipping up to three other terms) in the structure of the question to corresponding pairs of terms in the passage. The bigram scorer can incorporate prediction scores of term saliency of passage terms as term weights. Another one of the passage scorers 130 can be a string kernel scorer that outputs a string kernel similarity. The string kernel implementation may restrict passage terms under consideration to those predicted to be salient. If a passage term is not salient, it can be skipped during kernel computation. Other passage scorers known in the art can also be used.

A number of computational improvements in accuracy and efficiency can be observed in question answering computer systems that incorporate embodiments of salient term identification for passage justification. In one example, an area under the precision-recall curve, an F-score that incorporates precision and recall scores, a correlation coefficient, and a log-likelihood score were examined before and after incorporating the salient term methodology as described herein into two of twenty-one scorers of a question answering computer system. Statistically significant improvement was noted for all evaluation techniques when the salient term methodology was incorporated. Further, since passage justification need only be performed and scored on a reduced set of terms, i.e., the salient terms, total processing time and resource utilization is also reduced as compared to using all terms of a candidate passage for scoring.

Figure 2:
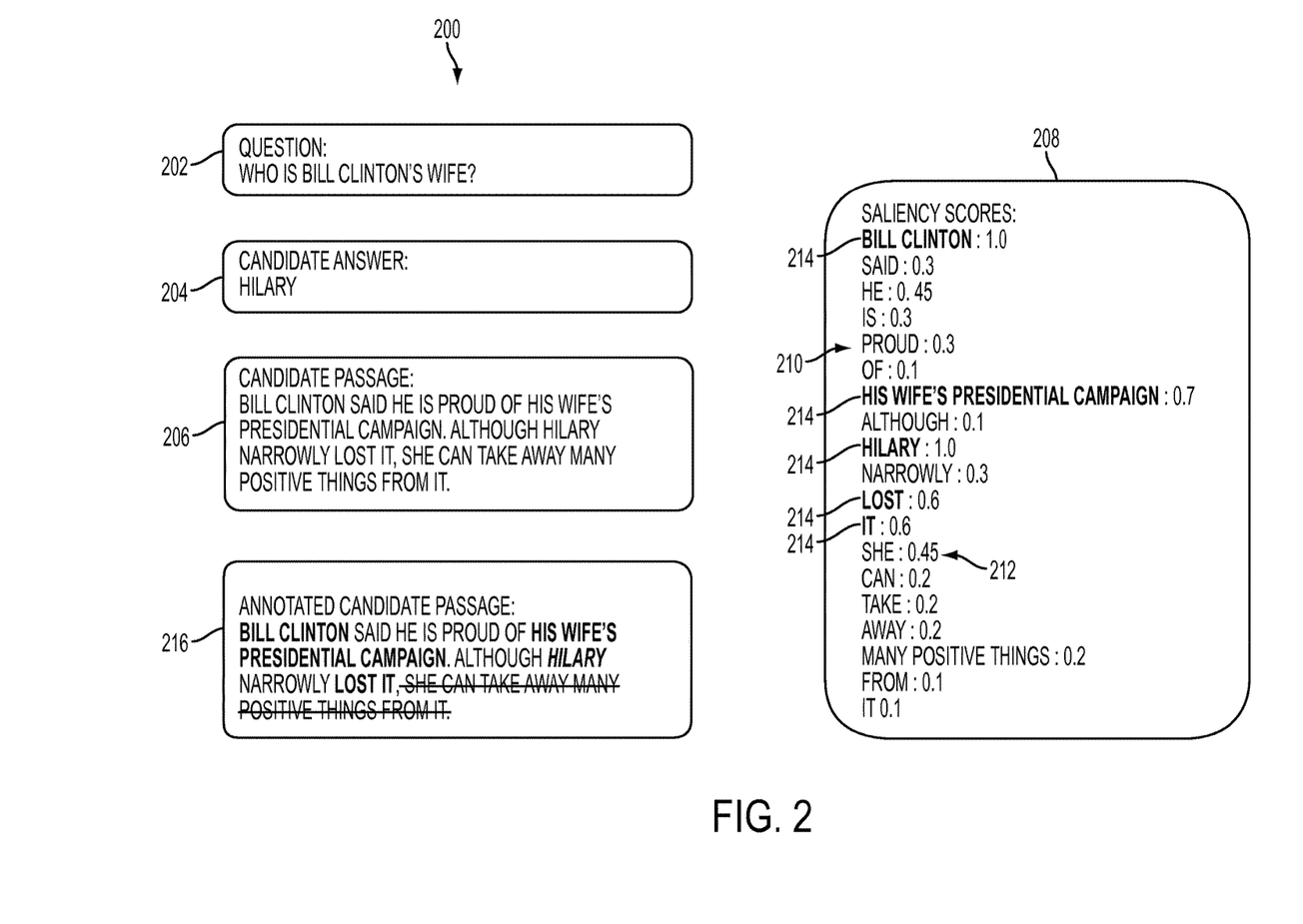
FIG. 2 depicts an example of passage annotation to support passage justification in accordance with an embodiment.

FIG. 2 depicts an example of passage annotation 200 to support passage justification in accordance with an embodiment. A question 202, candidate answer 204, and a candidate passage 206 can be presented to determine whether the candidate passage 206 provides supporting evidence to justify the candidate answer 204. After the training phase 102 of FIG. 1 has been performed such that a term saliency model 116 of FIG. 1 is available, the term saliency weighter 120 of FIG. 1 can produce saliency scores 208 that include a number of terms 210 parsed from the candidate passage 206 and term weights 212. Parsing of the candidate passage 206 may be performed by the syntactic and semantic annotator 122 of FIG. 1 and generation of the term weights 212 may be performed by the feature extractor 124 and saliency model applier 126 of FIG. 1. In the example of FIG. 2, terms 210 having term weights 212 with a value of 0.5 or greater are considered salient terms 214. The saliency scores 208 can be used by the saliency model applier 126 of FIG. 1 to annotate the candidate passage 206 as annotated candidate passage 216. In the example of FIG. 2, salient terms 214 are highlighted with boldface in the annotated candidate passage 216. An instance of the candidate answer 204 in the annotated candidate passage 216 may also be highlighted using a different color, underlining, or font feature, e.g., italicized. Word groups that provide no justification value or an insignificant saliency score may be stricken from consideration in the annotated candidate passage 216. The saliency scores 208 or a subset that only includes the salient terms 214 and corresponding term weights 212 can be sent to the passage scorers 130 of FIG. 1.

Figure 3:
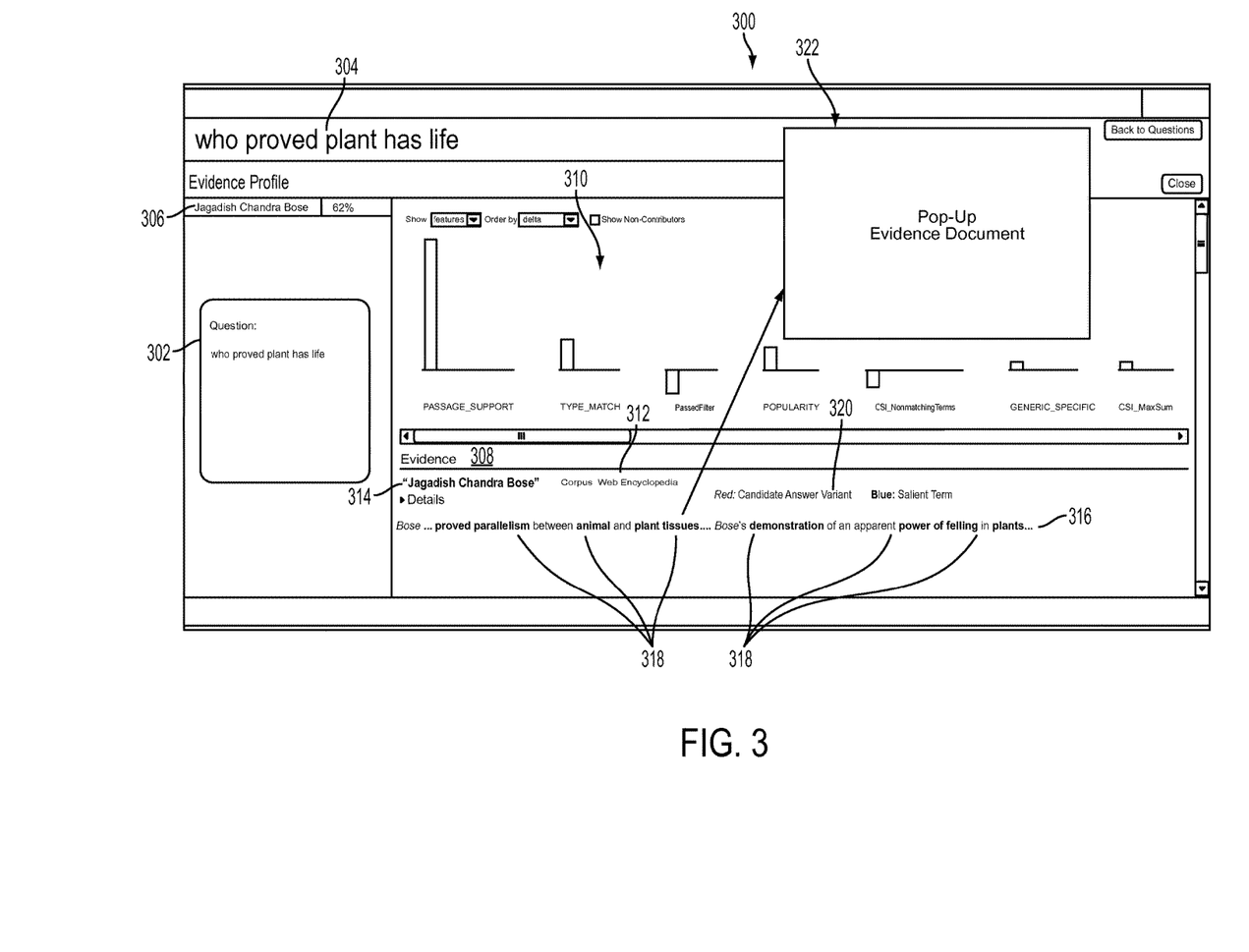
FIG. 3 depicts an example of a user interface to visualize evidence using salient terms in accordance with an embodiment.

FIG. 3 depicts an example of a user interface 300 to visualize evidence using salient terms as part of a question answering computer system in accordance with an embodiment. The example user interface 300 of FIG. 3 may illustrate a question 302, a question entry interface 304, a candidate answer 306, an evidence pane 308, and feature scores 310. The evidence pane 308 may identify a corpus 312 or data source from which the evidence to justify the candidate answer 306 has been taken. An evidence-based candidate answer 314 can be illustrated along with portions of a passage 316 that includes salient terms 318. A legend 320 may be included to aid in understanding highlighted distinctions of various terms in the passage 316. There may also be an option to view the full body of text from which the passage 316 was taken, for example, as a pop-up evidence document 322.

Figure 4:
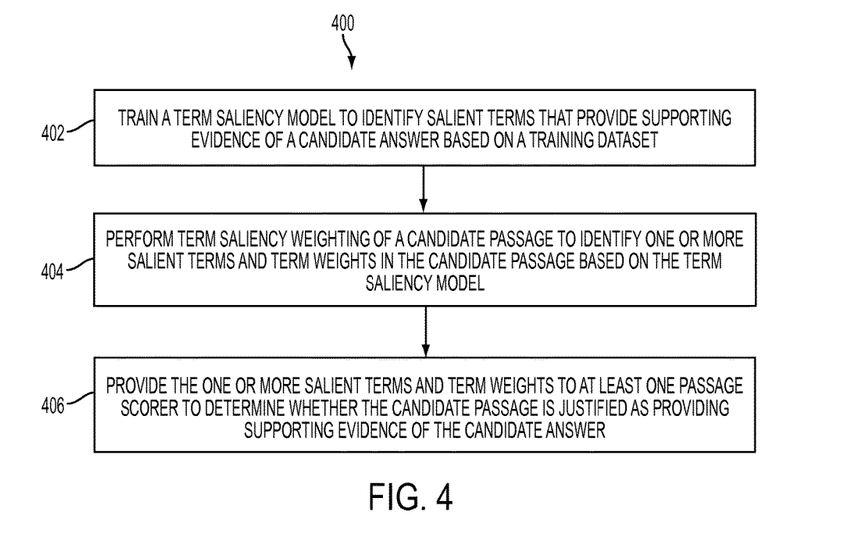
FIG. 4 depicts a process flow for identifying salient terms for passage justification in accordance with an embodiment.

FIG. 4 depicts a process flow 400 for identifying salient terms for passage justification in a question answering computer system in accordance with an embodiment. The process flow 400 provides an example of a method for identifying salient terms for passage justification in a question answering computer system. For purposes of explanation, the process flow 400 is described in terms of the examples of FIGS. 1-3 but can be implemented on various system configurations.

At block 402, a term saliency model 116 is trained to identify salient terms that provide supporting evidence of a candidate answer in a question answering computer system based on a training dataset 108. As previously described, the training dataset 108 can include a plurality of annotated candidate passage and question pairs 109. Training can include performing syntactic and semantic annotation on at least a subset of the annotated candidate passages to produce an annotated set of terms 111. Feature extraction may be performed on the annotated set of terms 111 based on a plurality of features and a corresponding question from the annotated candidate passage and question pairs 109 to determine a plurality of feature scores 113. The features can include a combination of syntactic, contextual, and semantic features. The feature scores 113 for a first set of the features can be determined from the annotated set of terms 111 in a first training stage. Potentially salient terms may be identified based on the feature scores 113 from the first training stage. The feature scores 113 for a second set of the features can be determined for neighboring terms of the potentially salient terms in a second training stage, where the first set of the features partially overlaps the second set of the features. A machine learning algorithm (e.g., logistic regression, support vector machines, etc.) may be used to train the term saliency model 116 based on the feature scores 113 and identified salient terms from the annotated candidate passages.

At block 404, the question answering computer system performs term saliency weighting of a candidate passage to identify one or more salient terms and term weights in the candidate passage based on the term saliency model 116. The candidate passage can be accessed from the application dataset 118 including a plurality of candidate passage and question pairs 119. Term saliency weighting can include performing syntactic and semantic annotation on the candidate passage to produce an annotated set of terms 123. Feature extraction can be performed on the annotated set of terms 123 based on a plurality of features and a corresponding question from the candidate passage and question pairs 119 to determine a plurality of feature scores 125. The term saliency model 116 can be applied to the feature scores 125 to identify one or more salient terms and term weights from the candidate passage.

At block 406, one or more salient terms and term weights can be provided to at least one passage scorer 130 of the question answering computer system to determine whether the candidate passage is justified as providing supporting evidence of the candidate answer. Scores from at least one passage scorer 130 can be aggregated by the passage justification aggregator 132 to determine whether the candidate passage is justified as providing supporting evidence of the candidate answer as supporting evidence 134.

Figure 5:
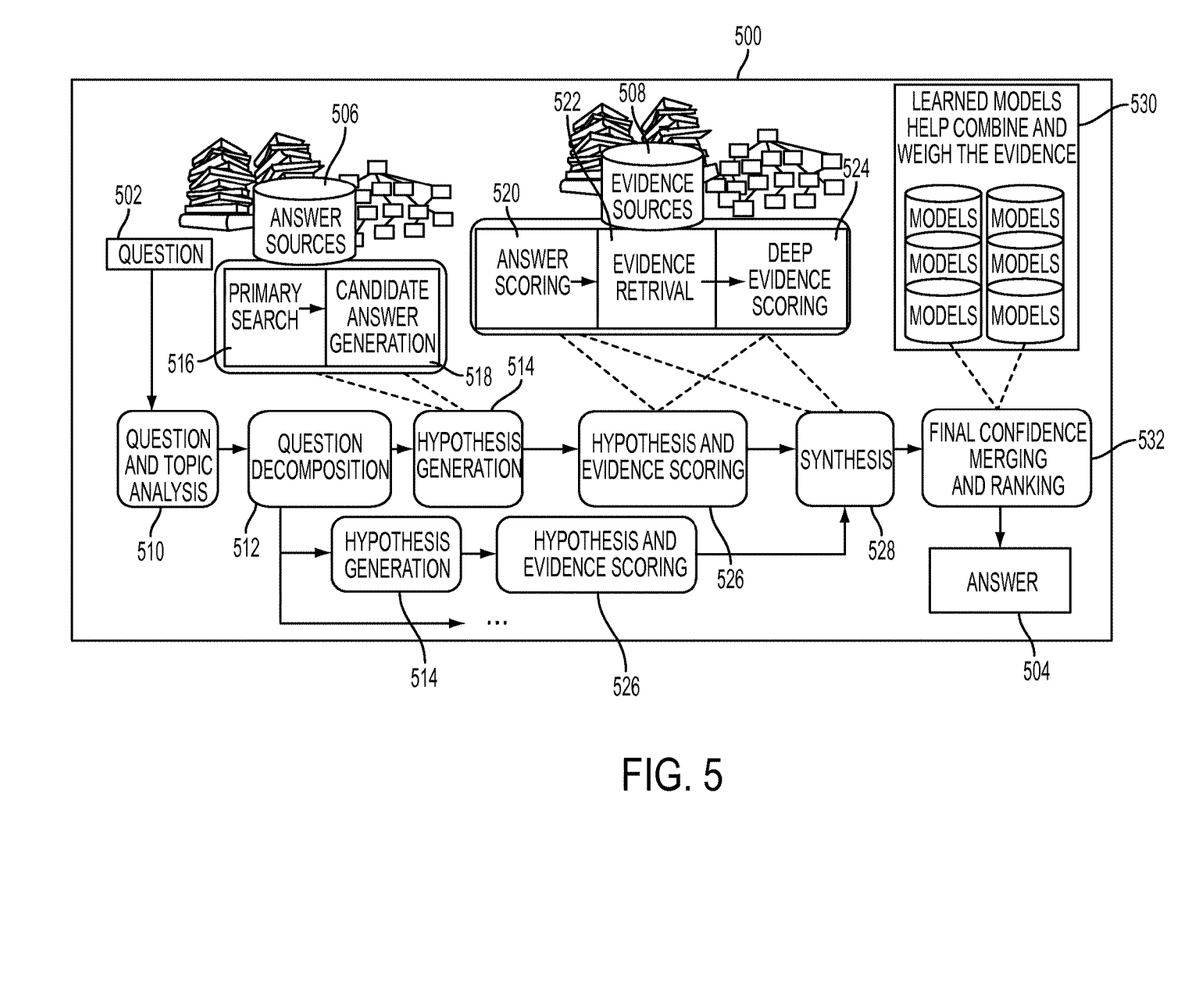
FIG. 5 depicts a high-level block diagram of a question-answer (QA) framework where embodiments of identifying salient terms for passage justification can be implemented in accordance with an embodiment.

Turning now to FIG. 5, a high-level block diagram of a question-answer (QA) framework 500 where embodiments described herein can be utilized is generally shown.

The QA framework 500 can be implemented to generate a ranked list of answers 504 (and a confidence level associated with each answer) to a given question 502. In an embodiment, general principles implemented by the framework 500 to generate answers 504 to questions 502 include massive parallelism, the use of many experts, pervasive confidence estimation, and the integration of shallow and deep knowledge. In an embodiment, the QA framework 500 shown in FIG. 5 is implemented by the Watson™ product from IBM.

The QA framework 500 shown in FIG. 5 defines various stages of analysis in a processing pipeline. In an embodiment, each stage admits multiple implementations that can produce alternative results. At each stage, alternatives can be independently pursued as part of a massively parallel computation. Embodiments of the framework 500 don't assume that any component perfectly understands the question 502 and can just look up the right answer 504 in a database. Rather, many candidate answers can be proposed by searching many different resources, on the basis of different interpretations of the question (e.g., based on a category of the question.) A commitment to any one answer is deferred while more and more evidence is gathered and analyzed for each answer and each alternative path through the system.

As shown in FIG. 5, the question and topic analysis 510 is performed and used in question decomposition 512. Hypotheses are generated by the hypothesis generation block 514 which uses input from the question decomposition 512, as well as data obtained via a primary search 516 through the answer sources 506 and candidate answer generation 518 to generate several hypotheses. Hypothesis and evidence scoring 526 is then performed for each hypothesis using evidence sources 508 and can include answer scoring 520, evidence retrieval 522 and deep evidence scoring 524.

A synthesis 528 is performed of the results of the multiple hypothesis and evidence scorings 526. Input to the synthesis 528 can include answer scoring 520, evidence retrieval 522, and deep evidence scoring 524. Learned models 530 can then be applied to the results of the synthesis 528 to generate a final confidence merging and ranking 532. A ranked list of answers 504 (and a confidence level associated with each answer) is then output.

Evidence retrieval and scoring plays a key role in the QA framework 500 shown in FIG. 5. Embodiments of identifying salient terms for passage justification can be utilized by the QA framework 500 to improve evidence retrieval and scoring. Embodiments can be utilized, for example, in evidence retrieval 522, where salient terms can be used to determine which passages from the evidence sources 508 should be used to justify a candidate answer. In deep evidence scoring 524, salient terms and term weights can be utilized to score the evidence as justifying are not justifying.

The framework 500 shown in FIG. 5 can utilize embodiments of identifying salient terms for passage justification described herein to create learned models 530 by training statistical machine learning algorithms on prior sets of questions and answers to learn how best to weight each of the hundreds of features relative to one another. These weights can be used at run time to balance all of the features when combining the final scores for candidate answers to new questions 502. In addition, embodiments can be used to generate a KB based on a corpus of data that replaces or supplements commercially available KBs.

Figure 6:
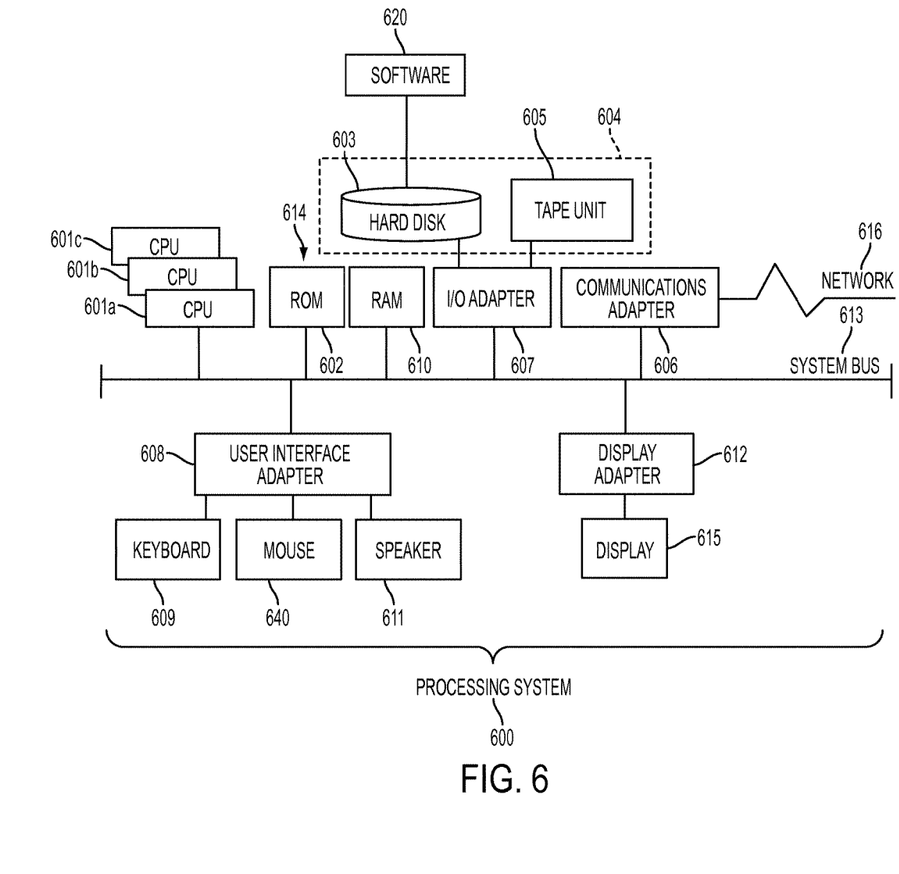
FIG. 6 depicts a processing system in accordance with an embodiment.

Referring now to FIG. 6, there is shown an embodiment of a processing system 600 for implementing the teachings herein. The processing system 600 is an example of a question answering computer system as previously referenced herein. In this embodiment, the processing system 600 has one or more central processing units (processors) 601*a*, 601*b*, 601*c*, etc. (collectively or generically referred to as processor(s) 601). Processors 601, also referred to as processing circuits, are coupled to system memory 614 and various other components via a system bus 613. Read only memory (ROM) 602 is coupled to system bus 613 and may include a basic input/output system (BIOS), which controls certain basic functions of the processing system 600. The system memory 614 can include ROM 602 and random access memory (RAM) 610, which is read-write memory coupled to system bus 613 for use by processors 601.

FIG. 6 further depicts an input/output (I/O) adapter 607 and a network adapter 606 coupled to the system bus 613. I/O adapter 607 may be a small computer system interface (SCSI) adapter that communicates with a hard disk 603 and/or tape storage drive 605 or any other similar component. I/O adapter 607, hard disk 603, and tape storage drive 605 are collectively referred to herein as mass storage 604. Software 620 for execution on processing system 600 may be stored in mass storage 604. The mass storage 604 is an example of a tangible storage medium readable by the processors 601, where the software 620 is stored as instructions for execution by the processors 601 to perform a method, such as the process flow 400 of FIG. 4. Network adapter 606 interconnects system bus 613 with an outside network 616 enabling processing system 600 to communicate with other such systems. A screen (e.g., a display monitor) 615 is connected to system bus 613 by display adapter 612, which may include a graphics controller to improve the performance of graphics intensive applications and a video controller. In one embodiment, adapters 607, 606, and 612 may be connected to one or more I/O buses that are connected to system bus 613 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 613 via user interface adapter 608 and display adapter 612. A keyboard 609, mouse 640, and speaker 611 can be interconnected to system bus 613 via user interface adapter 608, which may include, for example, a Super I/O chip integrating multiple device adapters into a single integrated circuit.

Thus, as configured in FIG. 6, processing system 600 includes processing capability in the form of processors 601, and, storage capability including system memory 614 and mass storage 604, input means such as keyboard 609 and mouse 640, and output capability including speaker 611 and display 615. In one embodiment, a portion of system memory 614 and mass storage 604 collectively store an operating system such as the AIX® operating system from IBM Corporation to coordinate the functions of the various components shown in FIG. 6.

Technical effects and benefits include identifying salient terms for passage justification in a question answering computer system to increase processing efficiency and reduce latency. Once salient terms are identified, they can be used in one or more portions of a computerized question answering process to reduce a number of passages analyzed in detail and improve accuracy of computer-generated results.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
performing syntactic and semantic annotation on at least a subset of annotated candidate passages from a plurality of annotated candidate passage and question pairs in a training dataset to produce an annotated set of terms by a question answering computer system during a training phase;
performing feature extraction on the annotated set of terms based on a plurality of features and a corresponding question from the annotated candidate passage and question pairs to determine a plurality of feature scores by the question answering computer system during the training phase;
training a term saliency model based on the extracted features and identified salient terms that provide supporting evidence of a candidate answer to the corresponding question from the annotated candidate passages by the question answering computer system during the training phase;
accessing, by the question answering computer system in an annotator phase, an application dataset comprising a plurality of candidate passage and question pairs;
performing term saliency weighting, by the question answering computer system in the annotator phase, of a candidate passage of the candidate passage and question pairs to identify one or more salient terms and term weights in the candidate passage based on the term saliency model to determine relevancy of the candidate passage to answering the corresponding question;
providing the one or more salient terms and term weights to at least one passage scorer of the question answering computer system in an application phase, the one or more salient terms comprising a reduced set of terms thereby lowering total processing time and resource utilization by the question answering computer system;
determining, by the at least one passage scorer of the question answering computer system in the application phase, whether the candidate passage is justified as providing supporting evidence of the candidate answer to the corresponding question; and
selecting the candidate passage to use in evidence retrieval by the question answering computer system based on determining that the candidate passage is justified as providing supporting evidence of the candidate answer to the corresponding question.

2. The method of claim 1, wherein the features comprise a combination of syntactic, contextual, and semantic features.

3. The method of claim 1, wherein the training further comprises:
  determining the feature scores for a first set of the features from the annotated set of terms in a first training stage;
  identifying potentially salient terms based on the feature scores from the first training stage; and
  determining the feature scores for a second set of the features of neighboring terms of the potentially salient terms, wherein the first set of the features partially overlaps the second set of the features.

4. The method of claim 1, wherein performing term saliency weighting further comprises:
  performing syntactic and semantic annotation on the candidate passage to produce an annotated set of terms;
  performing feature extraction on the annotated set of terms based on a plurality of features and a corresponding question from the candidate passage and question pairs to determine a plurality of feature scores; and
  applying the term saliency model to the extracted features to identify one or more salient terms and term weights from the candidate passage.

5. The method of claim 4, further comprising:
  aggregating scores from the at least one passage scorer to determine whether the candidate passage is justified as providing supporting evidence of the candidate answer.

6. A computer program product comprising:
  a non-transitory storage medium readable by a processing circuit of a question answering computer system and storing instructions for execution by the processing circuit to perform a method comprising:
    performing syntactic and semantic annotation on at least a subset of annotated candidate passages from a plurality of annotated candidate passage and question pairs in a training dataset to produce an annotated set of terms by the question answering computer system during a training phase;
  performing feature extraction on the annotated set of terms based on a plurality of features and a corresponding question from the annotated candidate passage and question pairs to determine a plurality of feature scores by the question answering computer system during the training phase;
  training a term saliency model based on the extracted features and identified salient terms that provide supporting evidence of a candidate answer to the corresponding question from the annotated candidate passages by the question answering computer system during the training phase;
  accessing, by the question answering computer system in an annotator phase, an application dataset comprising a plurality of candidate passage and question pairs;
  performing term saliency weighting, by the question answering computer system in the annotator phase, of a candidate passage of the candidate passage and question pairs to identify one or more salient terms and term weights in the candidate passage based on the term saliency model to determine relevancy of the candidate passage to answering the corresponding question;
  providing the one or more salient terms and term weights to at least one passage scorer of the question answering computer system in an application phase, the one or more salient terms comprising a reduced set of terms thereby lowering total processing time and resource utilization by the question answering computer system;
  determining, by the at least one passage scorer of the question answering computer system in the application phase, whether the candidate passage is justified as providing supporting evidence of the candidate answer to the corresponding question; and
  selecting the candidate passage to use in evidence retrieval by the question answering computer system based on determining that the candidate passage is justified as providing supporting evidence of the candidate answer to the corresponding question.

7. The computer program product of claim 6, wherein the features comprise a combination of syntactic, contextual, and semantic features.

8. The computer program product of claim 6, wherein the training further comprises:
  determining the feature scores for a first set of the features from the annotated set of terms in a first training stage;
  identifying potentially salient terms based on the feature scores from the first training stage; and
  determining the feature scores for a second set of the features of neighboring terms of the potentially salient terms, wherein the first set of the features partially overlaps the second set of the features.

9. The computer program product of claim 6, wherein performing term saliency weighting further comprises:
  performing syntactic and semantic annotation on the candidate passage to produce an annotated set of terms;
  performing feature extraction on the annotated set of terms based on a plurality of features and a corresponding question from the candidate passage and question pairs to determine a plurality of feature scores; and
  applying the term saliency model to the feature scores to identify one or more salient terms and term weights from the candidate passage.

10. The computer program product of claim 6, wherein the method further comprises:
  aggregating scores from the at least one passage scorer to determine whether the candidate passage is justified as providing supporting evidence of the candidate answer.

11. A system comprising:
  a memory having computer readable instructions; and
  a processor for executing the computer readable instructions, the computer readable instructions including:
  performing syntactic and semantic annotation on at least a subset of the annotated candidate passages from a plurality of annotated candidate passage and question pairs in a training dataset to produce an annotated set of terms by a question answering computer system during a training phase;
  performing feature extraction on the annotated set of terms based on a plurality of features and a corresponding question from the annotated candidate passage and question pairs to determine a plurality of feature scores by the question answering computer system during the training phase;
  training a term saliency model based on the extracted features and identified salient terms that provide supporting evidence of a candidate answer to the corresponding question from the annotated candidate passages by the question answering computer system during the training phase;
  accessing, by the question answering computer system in an annotator phase, an application dataset comprising a plurality of candidate passage and question pairs;

performing term saliency weighting, by the question answering computer system in the annotator phase, of a candidate passage of the candidate passage and question pairs to identify one or more salient terms and term weights in the candidate passage based on the term saliency model to determine relevancy of the candidate passage to answering the corresponding question;

providing the one or more salient terms and term weights to at least one passage scorer of the question answering computer system in an application phase, the one or more salient terms comprising a reduced set of terms thereby lowering total processing time and resource utilization by the question answering computer system;

determining, by the at least one passage scorer of the question answering computer system in the application phase, whether the candidate passage is justified as providing supporting evidence of the candidate answer to the corresponding question; and selecting the candidate passage to use in evidence retrieval by the question answering computer system based on determining that the candidate passage is justified as providing supporting evidence of the candidate answer to the corresponding question.

12. The system of claim 11, wherein the features comprise a combination of syntactic, contextual, and semantic features.

13. The system of claim 11, wherein the training further comprises:
determining the feature scores for a first set of the features from the annotated set of terms in a first training stage;
identifying potentially salient terms based on the feature scores from the first training stage; and
determining the feature scores for a second set of the features of neighboring terms of the potentially salient terms, wherein the first set of the features partially overlaps the second set of the features.

14. The system of claim 13, wherein performing term saliency weighting further comprises:
performing syntactic and semantic annotation on the candidate passage to produce an annotated set of terms;
performing feature extraction on the annotated set of terms based on a plurality of features and a corresponding question from the candidate passage and question pairs to determine a plurality of feature scores; and
applying the term saliency model to the extracted features to identify one or more salient terms and term weights from the candidate passage.

15. The system of claim 11, wherein the computer readable instructions further comprise:
aggregating scores from the at least one passage scorer to determine whether the candidate passage is justified as providing supporting evidence of the candidate answer.

* * * * *